Sept. 19, 1950          R. K. WEAVER          2,522,911
BOB PIN
Filed April 30, 1947
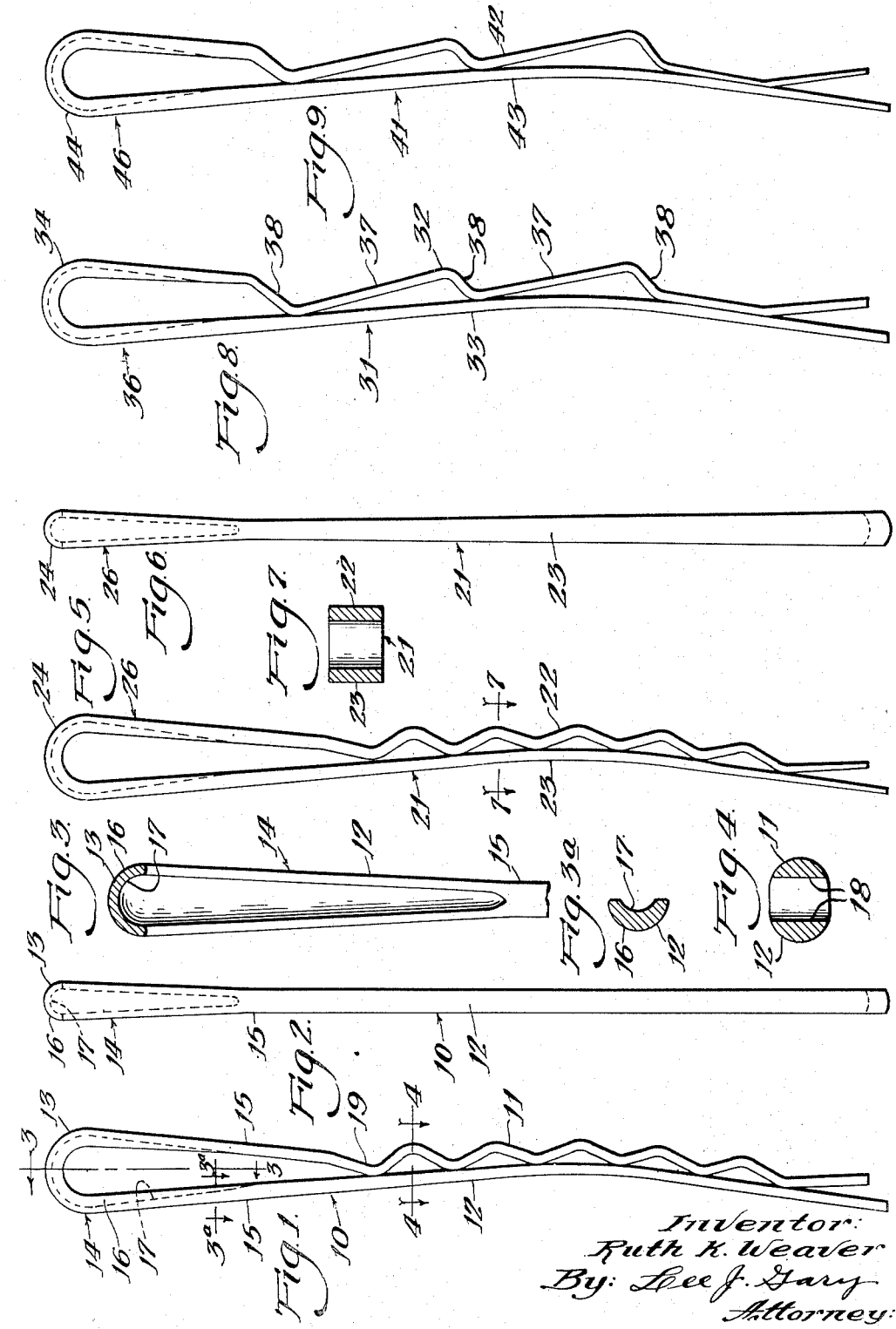
Inventor:
Ruth K. Weaver
By: Lee J. Gary
Attorney Patented Sept. 19, 1950

2,522,911

UNITED STATES PATENT OFFICE 2,522,911

BOB PIN

Ruth K. Weaver, Chicago, Ill., assignor to Gaylord Products, Incorporated, Chicago, Ill., a corporation of Delaware Application April 30, 1947, Serial No. 744,919

2 Claims. (Cl. 132—50)

This invention relates to improvements in bob pins, and is more particularly concerned with the provision of a bob pin of the type formed of resilient wire to provide a pair of opposing legs normally held in engagement by a connecting loop portion. In the use of bob pins of this type, a clamping force is applied from the connecting loop portion to the legs to hold the bob pin against displacement from the hair.

It is an object of the present invention to provide a bob pin constructed to increase the clamping force applied to the legs by the connecting loop portion.

This invention further contemplates the provision of a bob pin adapted to be inexpensively formed from either flat or half-round wire to provide a connecting loop portion of concavo-convex cross section, to thereby increase the clamping force applied to the legs by the connecting loop portion.

This invention embodies other novel features, details of construction and arrangement of parts, which are hereinafter set forth in the specification and claims, and illustrated in the accompanying drawing wherein:

Fig. 1 is a side elevational view showing a bob pin embodying features of this invention, the bob pin being formed of half-round wire and having legs of uniform width and thickness.

Fig. 2 is a front elevational view of same.

Fig. 3 is an enlarged fragmentary sectional view taken along the line 3—3 of Fig. 1.

Fig. 3a is a sectional view taken along the line 3a—3a of Fig. 1.

Fig. 4 is an enlarged transverse sectional view taken along the line 4—4 of Fig. 1.

Fig. 5 is a side elevational view showing a modified form of this invention in which, the bob pin is formed from flat wire and having legs of gradually increasing width and decreasing thickness from the loop end toward the free end of the legs.

Fig. 6 is a front elevational view of same.

Fig. 7 is an enlarged transverse sectional view taken along the line 7—7 of Fig. 5.

Fig. 8 is a side elevational view illustrating another modified form of this invention in which, the bob pin is formed from half-round wire and provided with legs of uniform width and thickness throughout their length, one leg being formed with ratchet type crimps.

Fig. 9 is a side elevational view illustrating another modified form of this invention in which, the bob pin is formed from flat wire and provided with legs of progressively increasing width and decreasing thickness from the loop end toward the free end of the legs, one of said legs being formed with ratchet type crimps.

Referring now to the drawing for a better understanding of this invention, and more particularly to Figs. 1 to 4 therein, a bob pin 10 is shown as comprising a crimped leg 11 and an opposing leg 12 which are normally held in contacting engagement by a connecting loop portion 13. The bob pin is adapted to be formed from half-round resilient wire and provided with legs of uniform width and thickness from a point indicated at 15 to the free ends of the legs.

In order to substantially increase the clamping force applied to the legs 11 and 12 by the connecting loop portion 13, the loop end of the bob pin, generally indicated at 14, is formed concavo-convex in cross section. In forming the bob pin, it is contemplated that the loop end 14 may, if desired, be slightly wider than the legs 11 and 12, as illustrated in Fig. 2. In forming the bob pin of half-round wire, it will be noted that the convex surface 16 extends throughout the length of the bob pin, and that the concave surface 17 terminates by merging with the flat opposing surfaces 18 of the legs 11 and 12 at a point between the connecting loop portion 13 and the first adjacent crimp 19 formed in the leg 11.

By forming the bob pin with a connecting loop end 14 of concavo-convex cross section, it will be noted that the legs 11 and 12 will apply a greater clamping force to a lock of hair than is applied by the legs of bob pins having connecting loop ends of round or rectangular cross section. It will further be noted that a bob pin constructed as shown and heretofore described will not readily have its clamping force impaired due to the metal at the loop end 14 being bent beyond its elastic limits.

Referring now to Figs. 5, 6 and 7 in the drawing, a modified form of bob pin 21 is shown as formed from resilient flat wire to provide a crimped leg 22, an opposing leg 23 and a connecting loop portion 24. In this form of the invention, the loop end 26 of the bob pin is formed concavo-convex in cross section, as illustrated in Fig. 3, to increase the clamping force applied by the legs 22 and 23. The legs 22 and 23 are formed with a gradually increasing width and decreasing thickness from the loop end 26 toward the free ends of the legs.

Referring now to Fig. 8 in the drawing, a further modified form of this invention is shown as comprising a bob pin 31 formed of half-round resilient wire to provide a crimped leg 32, an opposing leg 33 and a connecting loop portion 34. The loop end 36 of the bob pin is formed concavo-convex in cross section, as heretofore illustrated and described in connection with the form of the invention illustrated in Figs. 1 to 4. The legs 32 and 33 are formed of substantially uniform width and thickness throughout their length. This form of the invention distinguishes over the form illustrated in Figs. 1 to 4 in the provision of ratchet type crimps provided along the crimped leg 32. The crimped leg 32 is provided with relatively long diverging portions 37 and relatively short outwardly converging portions 38, the outwardly converging portions having their inner ends normally engaging the opposing leg 33 and preferably disposed at an angle of from 30° to 90° from the longitudinal axis of the bob pin to serve as abutment shoulders to yieldably resist displacement of the bob pin from the hair.

Fig. 9 in the drawing illustrates a further modified form of this invention in which, a bob pin 41 is formed from flat resilient wire to provide a crimped leg 42, an opposing leg 43 and a connecting loop portion 44. The loop end 46 of the bob pin is formed concavo-convex in cross section, as heretofore shown and described in connection with the other forms of this invention. The legs 42 and 43 are formed with a gradually increasing width and decreasing thickness from the loop end 46 toward the free ends of the legs. The leg 42 is formed with ratchet type crimps of the type heretofore shown and described in connection with the form of the invention illustrated in Fig. 8.

In each of the several forms of the invention thus shown and described, it will be noted that the bob pins may be formed from either half-round or flat resilient wire and provided with concavo-convex loop ends adapted to substantially increase the clamping force applied by the legs to a lock of hair.

While this invention has been shown in several forms, it is obvious to those skilled in the art that it is not so limited but is susceptible of various changes and modifications without departing from the spirit and scope of the claimed invention.

I claim as my invention:

1. A bob pin comprising a length of resilient material formed throughout its length and bent intermediate its ends to provide a pair of flexible opposing legs of greater width than thickness, and a connecting loop portion of greater width than thickness, said loop portion and a portion of each leg adjacent thereto being formed concavo-convex in cross-section throughout their entire width and of gradually increasing width and decreasing thickness toward the center of the loop portion, the outer surfaces of the loop portion and adjacent leg portions being formed convex.

2. A bob pin according to claim 1 in which the legs are formed with flat opposing inner surfaces and with convex outer surfaces throughout the major portions of their lengths, one of said legs being crimped.

RUTH K. WEAVER.

REFERENCES CITED

The following references are of record in the file of this patent:

UNITED STATES PATENTS

| Number | Name | Date |
|---|---|---|
| 938,715 | Scott | Nov. 2, 1909 |
| 1,274,344 | Staub | July 30, 1918 |
| 1,681,271 | Williams | Aug. 21, 1928 |
| 2,396,367 | Gaylord et al. | Mar. 12, 1946 |
| 2,414,124 | Reynolds | Jan. 14, 1947 |